(12) United States Patent
Woo et al.

(10) Patent No.: US 12,491,806 B2
(45) Date of Patent: Dec. 9, 2025

(54) SLIDE TRANSFER DEVICE FOR VEHICLE

(71) Applicants: HYUNDAI MOTOR COMPANY, Seoul (KR); KIA CORPORATION, Seoul (KR); KBI DONGKOOK IND. CO., LTD., Seoul (KR)

(72) Inventors: Jung Hoon Woo, Suwon-si (KR); Dae Hee Lee, Incheon (KR); Hong Sik Chang, Hwaseong-si (KR); Jin Suk Seo, Seoul (KR); Hye Kyung Kim, Suwon-si (KR); Kwan Woo Lee, Suwon-si (KR); Dong Yong Choi, Suwon-si (KR); Dong il Son, Ulsan (KR); Dong Hyuk Choi, Ulsan (KR); Chang Bok Park, Ulsan (KR); O Sim Kwon, Hwaseong-si (KR); Sun Kyung Kim, Ulsan (KR)

(73) Assignees: HYUNDAI MOTOR COMPANY, Seoul (KR); Kia Corporation, Seoul (KR); KBI Dongkook Ind. Co., Ltd., Seoul (KR)

( * ) Notice: Subject to any disclaimer, the term of this patent is extended or adjusted under 35 U.S.C. 154(b) by 267 days.

(21) Appl. No.: 18/521,453

(22) Filed: Nov. 28, 2023

(65) Prior Publication Data
US 2024/0416811 A1    Dec. 19, 2024

(30) Foreign Application Priority Data
Jun. 19, 2023    (KR) ........................ 10-2023-0077846

(51) Int. Cl.
*B60N 2/75*    (2018.01)

(52) U.S. Cl.
CPC ............. *B60N 2/773* (2018.02); *B60N 2/793* (2018.02)

(58) Field of Classification Search
CPC . B60N 2/773; B60N 2/793; B60R 2011/0007; B60R 2011/0084
See application file for complete search history.

(56) References Cited

U.S. PATENT DOCUMENTS

| | | | | |
|---|---|---|---|---|
| 5,732,994 | A * | 3/1998 | Stancu .................. | B60N 2/773 224/400 |
| 2002/0089217 | A1* | 7/2002 | Scheerhorn .............. | B60R 7/04 297/188.19 |
| 2002/0139824 | A1* | 10/2002 | Panhelleux ............ | B60R 11/00 224/275 |
| 2017/0259714 | A1* | 9/2017 | Mao ....................... | B60N 2/773 |
| 2021/0114526 | A1* | 4/2021 | Elsarelli ................. | F16C 1/106 |

FOREIGN PATENT DOCUMENTS

| KR | 10-2004-0098364 A | 11/2004 |
|---|---|---|
| KR | 10-2598407 B1 | 11/2023 |

* cited by examiner

*Primary Examiner* — David R Dunn
*Assistant Examiner* — Tania Abraham
(74) *Attorney, Agent, or Firm* — MORGAN, LEWIS & BOCKIUS LLP

(57) ABSTRACT

A slide transfer device for a vehicle includes a first rail portion fixed to a vehicle body, a second rail portion rail-coupled to the first rail portion to slide in the front and rear direction and coupled to a movement guide protruding from the first rail portion, and a damper mounted in a mounting hole formed in the second rail portion and configured to support the movement guide inserted into the mounting hole of the second rail portion.

13 Claims, 11 Drawing Sheets

SLIDE TRANSFER DEVICE FOR VEHICLE

CROSS-REFERENCE TO RELATED APPLICATION

The present application claims priority to Korean Patent Application No. 10-2023-0077846, filed on Jun. 19, 2023, the entire contents of which is incorporated herein for all purposes by this reference.

BACKGROUND OF THE PRESENT DISCLOSURE

Field of the Present Disclosure

The present disclosure relates to a slide transfer device for a vehicle, and more particularly, to a slide transfer device for a vehicle capable of improving the performance of absorbing vibration and compensating shaft misalignments when an upper rail slides along a lower rail.

Description of Related Art

Generally, a vehicle console is a structure provided in a space between a driver's seat and a passenger seat in a vehicle interior, and is used as a storage place for storing items used by a driver and a passenger.

In addition to storing items, the vehicle console is also used for resting a driver's arm to reduce driver's fatigue due to long time driving.

For these purposes, a general vehicle console has a shape of a box with an openable top, and includes a console main body coupled to a floor surface between a driver's seat and a passenger seat, and a cover member hinged to one side of the top of the console main body to cover the open top.

Here, the console main body has the shape of a box with an openable top and has formed therein a storage space to store items.

The cover member is hinged to one side of the top of the console main body and serves to open or close the open top of the console main body. The cover member also serves as an armrest allowing the driver to comfortably rest his arm after covering the top of the console main body.

The cover member is mounted to be slidably movable from the console body to be selectively slid with respect to the position of the driver's arm.

However, in a structure provided with a bearing for a sliding movement of the cover member, a gap is inevitably generated in a state of the bearing being assembled to a moving rail, and thus additional components may be included in the structure to compensate the gap, which consequently results in problems such as increase in number of assembly processes and the number of components.

Moreover, due to the gap, the vibration from a vehicle body is transmitted to the cover member through the console main body and the moving rail and then is transmitted to the driver through the cover member, generating a problem of quality deterioration as well as worsening the quality of operation feeling due to a high operating force generated by the gap.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a slide transfer device for a vehicle, the device including a structure in which an upper rail slides along a lower rail and the upper rail slides in the longitudinal direction of a movement guide protruding from the lower rail, and a bearing is mounted inside a mounting hole, formed in the upper rail and into which the movement guide is inserted, so that the bearing absorbs vibration generated when the upper rail slides, enabling a stable sliding movement.

In one aspect, the present disclosure provides a slide transfer device for a vehicle, the slide transfer device including a first rail portion fixed to a vehicle body, a second rail portion rail-coupled to the first rail portion to slide in the front and rear direction and coupled to a movement guide protruding from the first rail portion, and a damper mounted in a mounting hole formed in the second rail portion and configured to support the movement guide inserted into the mounting hole of the second rail portion.

In an exemplary embodiment of the present disclosure, the movement guide may extend at an inclination from the upper surface of the first rail portion and may be inserted into the mounting hole of the second rail portion.

In another exemplary embodiment of the present disclosure, the damper may include a diameter corresponding to the internal diameter of the mounting hole, and the center portion of the damper may surround the external circumferential surface of the movement guide.

In yet another exemplary embodiment of the present disclosure, the damper may include a plurality of holes formed radially from the center portion thereof surrounding the external circumferential surface of the movement guide.

In yet another exemplary embodiment of the present disclosure, the damper may be made of an elastic material and may have one side open to allow the movement guide to be positioned in the center portion thereof.

In still yet another exemplary embodiment of the present disclosure, the damper may be provided in plural and at least one dampers may be mounted in the mounting hole.

In a further exemplary embodiment of the present disclosure, the first rail portion may include a front panel assembly and a rear panel assembly configured to support a lead screw being configured to transmit operating torque to the second rail portion, and the front panel assembly and the rear panel assembly may include a support guide configured to support the lead screw, a driving motor configured to rotate the lead screw, and a reducer configured to reduce the rotation speed of the driving motor.

In another further exemplary embodiment of the present disclosure, the front panel assembly and the rear panel assembly may include bearing members, mounted in the support guide and in the reducer, respectively, and surrounding the external circumferential surface of the lead screw being axis-coupled to the support guide and to the reducer.

In yet another further exemplary embodiment of the present disclosure, the bearing member may be made of an elastic material and may include a plurality of holes formed radially from the center portion thereof.

In yet another further exemplary embodiment of the present disclosure, the slide transfer device may further include a cable portion, connected to a main wiring configured to slide together with the second rail portion and electrically contacting with the main wiring, and a cable main body, configured to allow the cable portion to be selectively drawn out or drawn in as the second rail portion slides in the front and rear direction of the first rail portion.

In still yet another further exemplary embodiment of the present disclosure, the cable portion may include a connector member electrically contacting with the main wiring, and a draw-out member, connected to the connector member, extending in the left and right direction of the second rail portion, and wound inside the cable main body fixed to the first rail portion.

In a still further exemplary embodiment of the present disclosure, the draw-out member may be a flexible flat cable (FFC).

Other aspects and exemplary embodiments of the present disclosure are discussed infra.

It is to be understood that the term "vehicle" or "vehicular" or other similar term as used herein is inclusive of motor vehicles in general, such as passenger vehicles including sports utility vehicles (SUVs), buses, trucks, various commercial vehicles, watercraft including a variety of boats and ships, aircraft, and the like, and includes hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example, a vehicle powered by both gasoline and electricity.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

The above and other features of the present disclosure are discussed infra.

Figure 1:
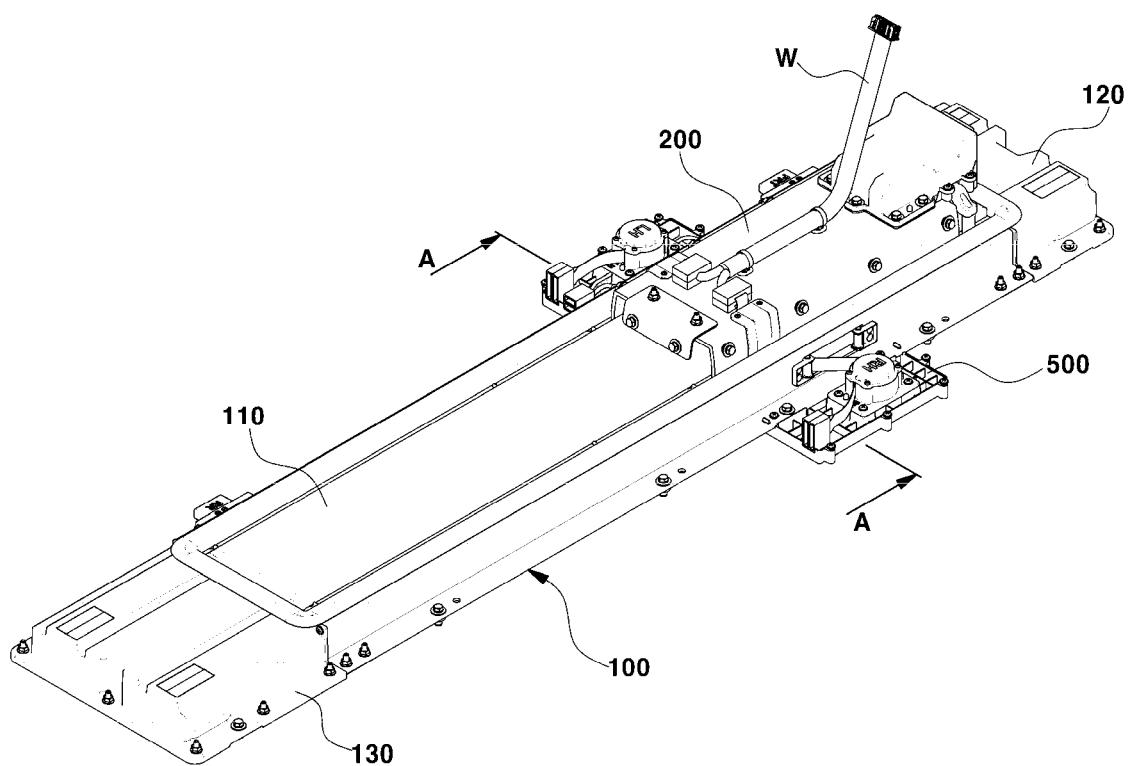
FIG. 1 is a view exemplarily illustrating a slide transfer device for a vehicle according to an exemplary embodiment of the present disclosure.

It may be understood that the appended drawings are not necessarily to scale, presenting a somewhat simplified representation of various features illustrative of the basic principles of the present disclosure. The predetermined design features of the present disclosure as included herein, including, for example, specific dimensions, orientations, locations, and shapes will be determined in part by the particularly intended application and use environment.

In the figures, reference numbers refer to the same or equivalent portions of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Description will now be provided in detail according to exemplary embodiments included herein, with reference to the accompanying drawings.

Advantages and features of the present disclosure, and a method of achieving the same, will be apparent with reference to the exemplary embodiments described below in detail.

However, the present disclosure may be embodied in various forms, and should not be construed as being limited to the exemplary embodiments set forth herein. Rather, the exemplary embodiments are provided so that the present disclosure will be thorough and complete, and will fully convey the scope of the present disclosure to those skilled in the art. The present disclosure is defined only by the categories of the claims.

In describing the present disclosure, if a detailed explanation of a related known function or construction is considered to unnecessarily obscure the gist of the present disclosure, such explanation has been omitted but would be understood by those skilled in the art.

Figure 2:
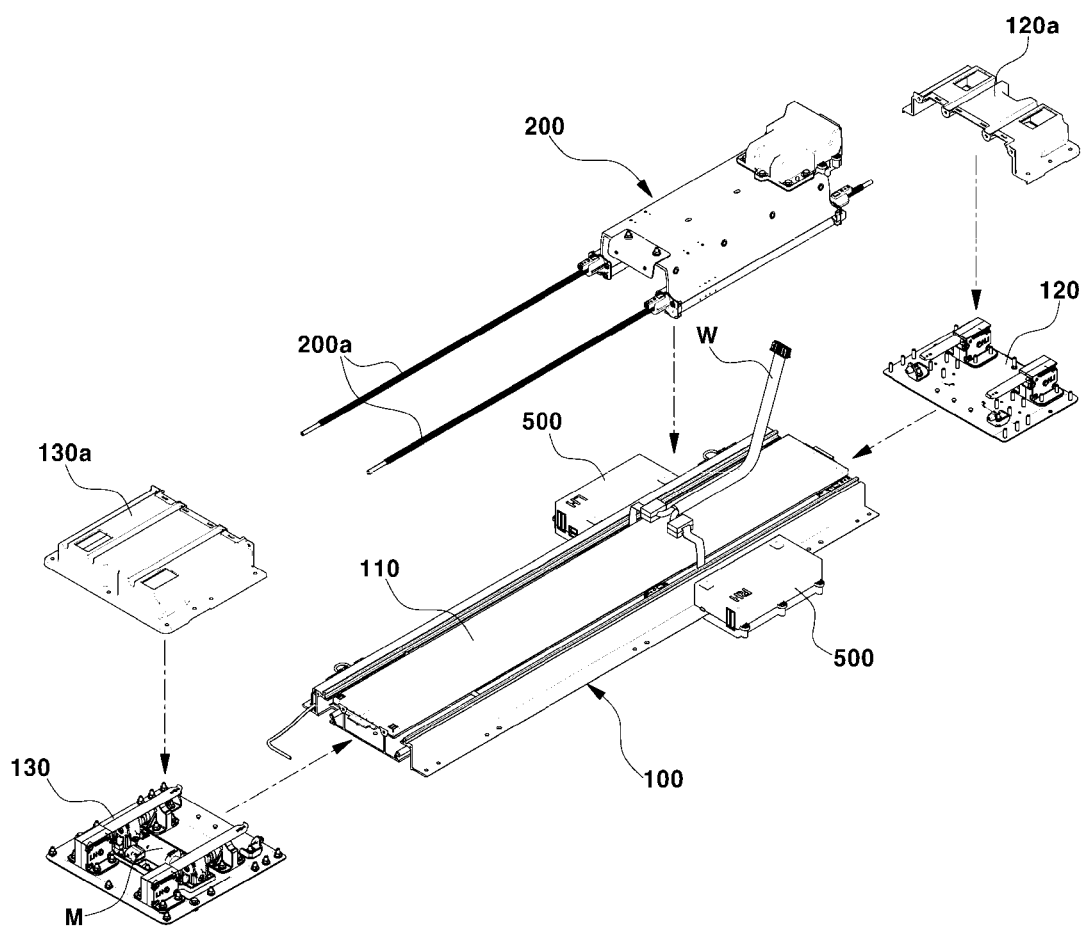
FIG. 2 is an exploded perspective view of a slide transfer device for a vehicle according to an exemplary embodiment of the present disclosure.

FIG. 1 is a view exemplarily illustrating a slide transfer device for a vehicle according to an exemplary embodiment of the present disclosure, and FIG. 2 is an exploded perspective view of a slide transfer device for a vehicle according to an exemplary embodiment of the present disclosure.

Figure 3:
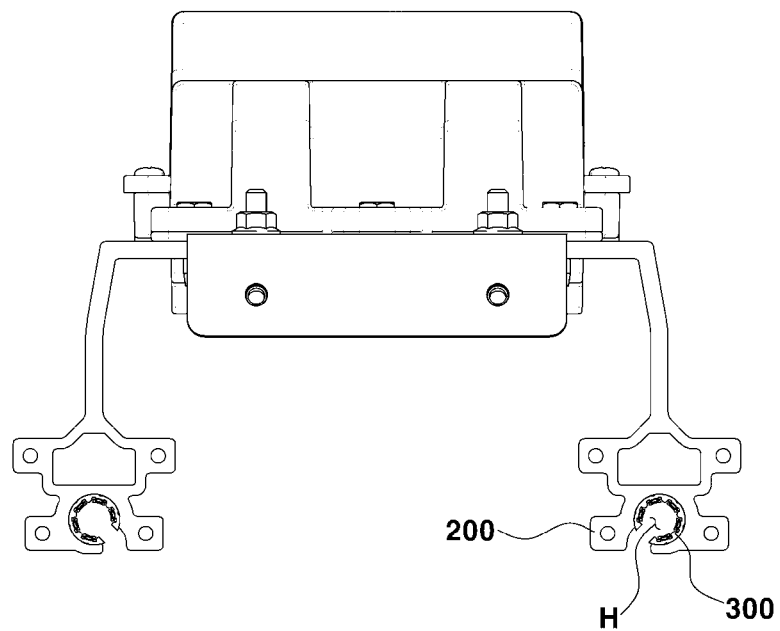
FIG. 3 is a view exemplarily illustrating a second rail portion of a slide transfer device for a vehicle according to an exemplary embodiment of the present disclosure.
Figure 4:
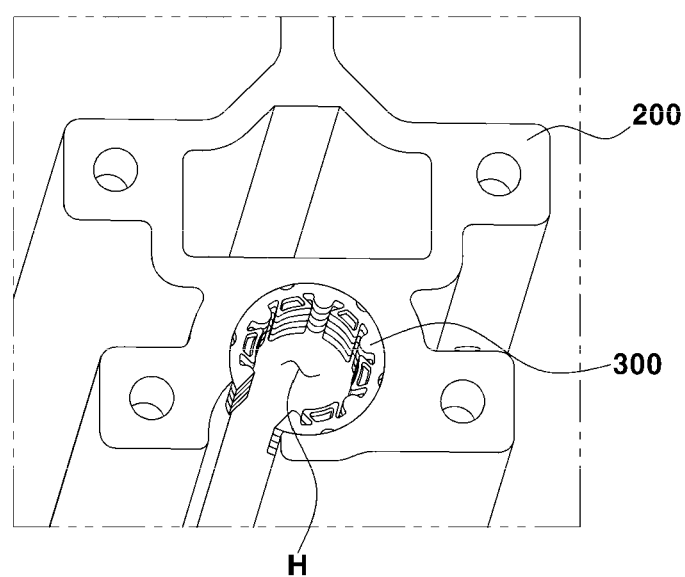
FIG. 4 is a view exemplarily illustrating a state in which a damper is mounted in a slide transfer device for a vehicle according to an exemplary embodiment of the present disclosure.
Figure 5:
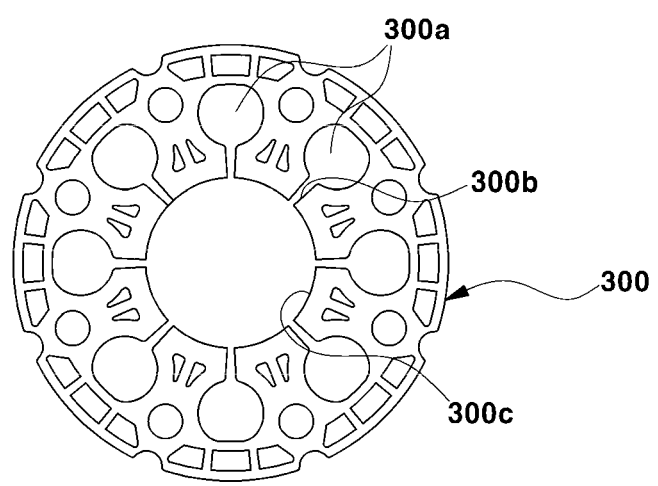
FIG. 5 is a view exemplarily illustrating a damper for a slide transfer device for a vehicle according to an exemplary embodiment of the present disclosure.

FIG. 3 is a view exemplarily illustrating a second rail portion of a slide transfer device for a vehicle according to an exemplary embodiment of the present disclosure, FIG. 4 is a view exemplarily illustrating a state in which a damper is mounted in a slide transfer device for a vehicle according to an exemplary embodiment of the present disclosure, and FIG. 5 is a view exemplarily illustrating a damper for a slide transfer device for a vehicle according to an exemplary embodiment of the present disclosure.

Figure 6:
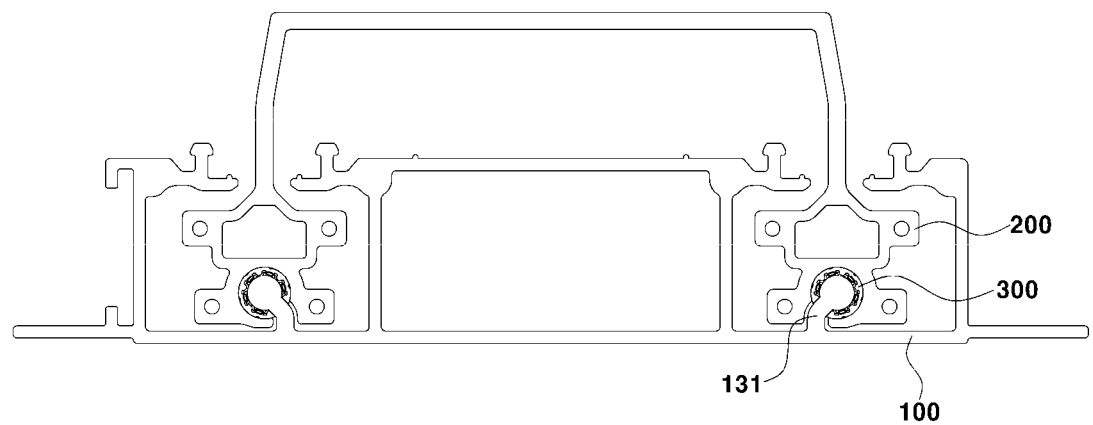
FIG. 6 is a cross section A-A of FIG. 1 illustrating a state in which a first rail portion and a second rail portion of a slide transfer device for a vehicle according to an exemplary embodiment of the present disclosure are rail-coupled to each other.
Figure 7:
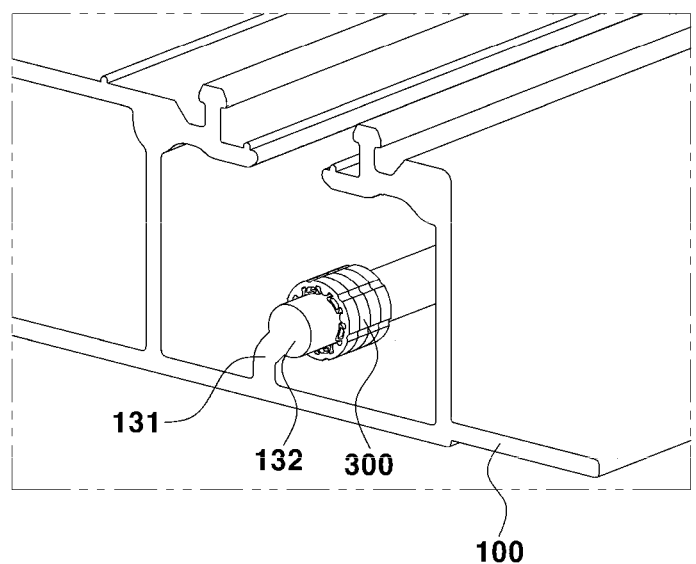
FIG. 7 is a view exemplarily illustrating a state in which a damper is coupled to a movement guide of a slide transfer device for a vehicle according to an exemplary embodiment of the present disclosure.

FIG. 6 is a cross section A-A of FIG. 1 illustrating a state in which a first rail portion and a second rail portion of a slide transfer device for a vehicle according to an exemplary embodiment of the present disclosure are rail-coupled to each other, and FIG. 7 is a view exemplarily illustrating a state in which a damper is coupled to a movement guide of a slide transfer device for a vehicle according to an exemplary embodiment of the present disclosure.

Figure 8:
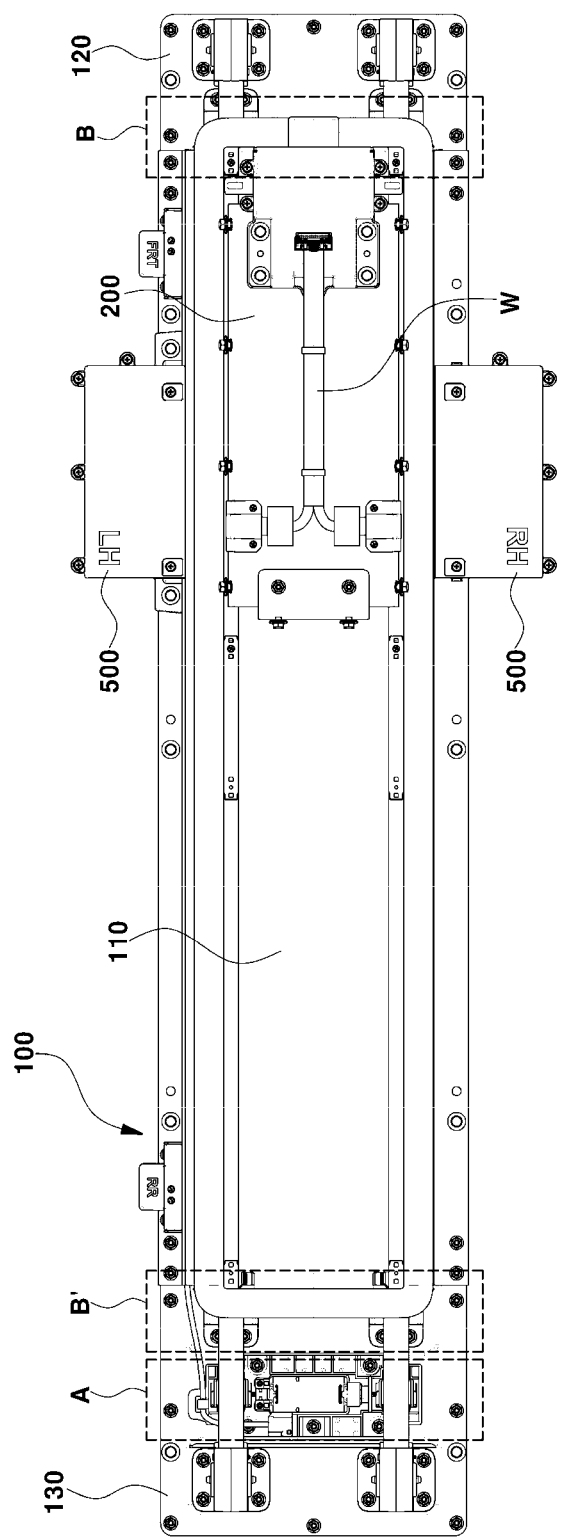
FIG. 8 is a view exemplarily illustrating a front panel assembly and a rear panel assembly of a slide transfer device for a vehicle according to an exemplary embodiment of the present disclosure.
Figure 9:
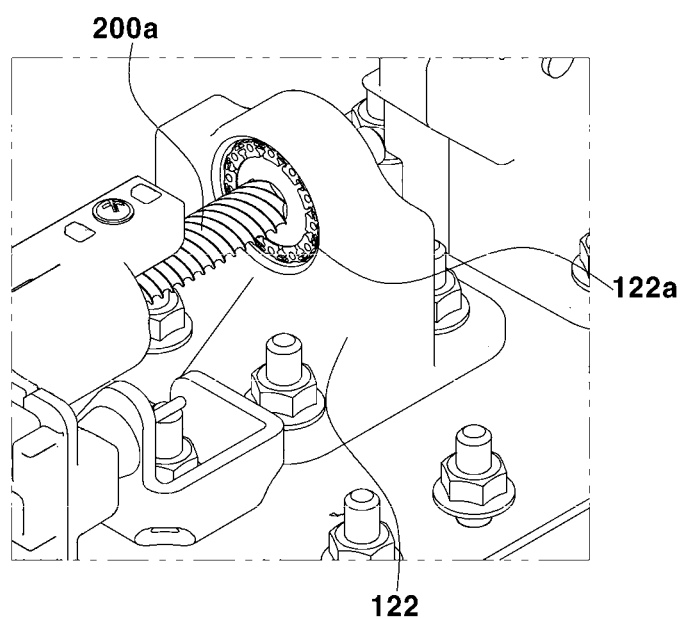
FIG. 9 and FIG. 10 are views of areas A, B, and B' of FIG. 8 illustrating the structures of a support guide and a reducer for a slide transfer device for a vehicle according to an exemplary embodiment of the present disclosure.
Figure 10:
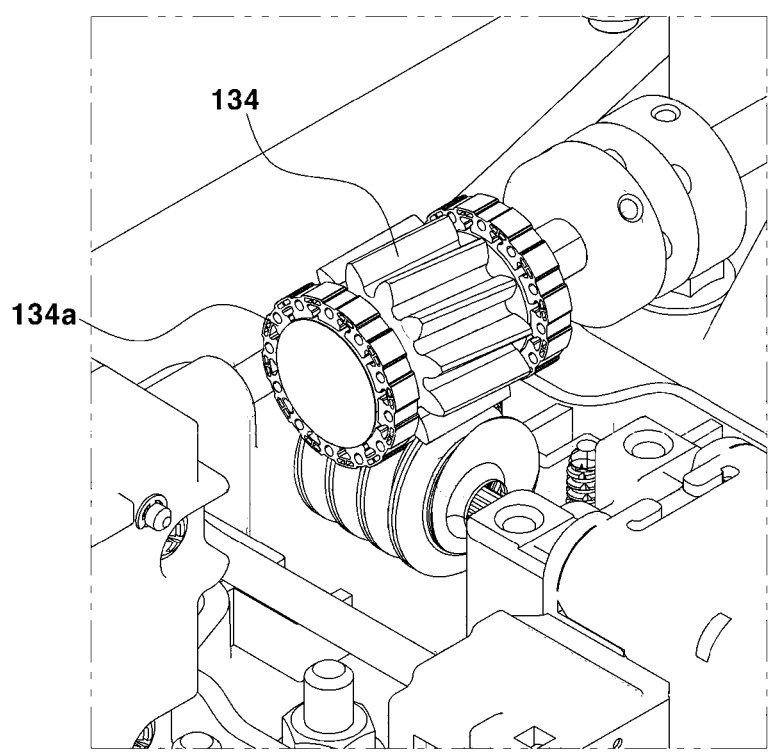
Figure 11:
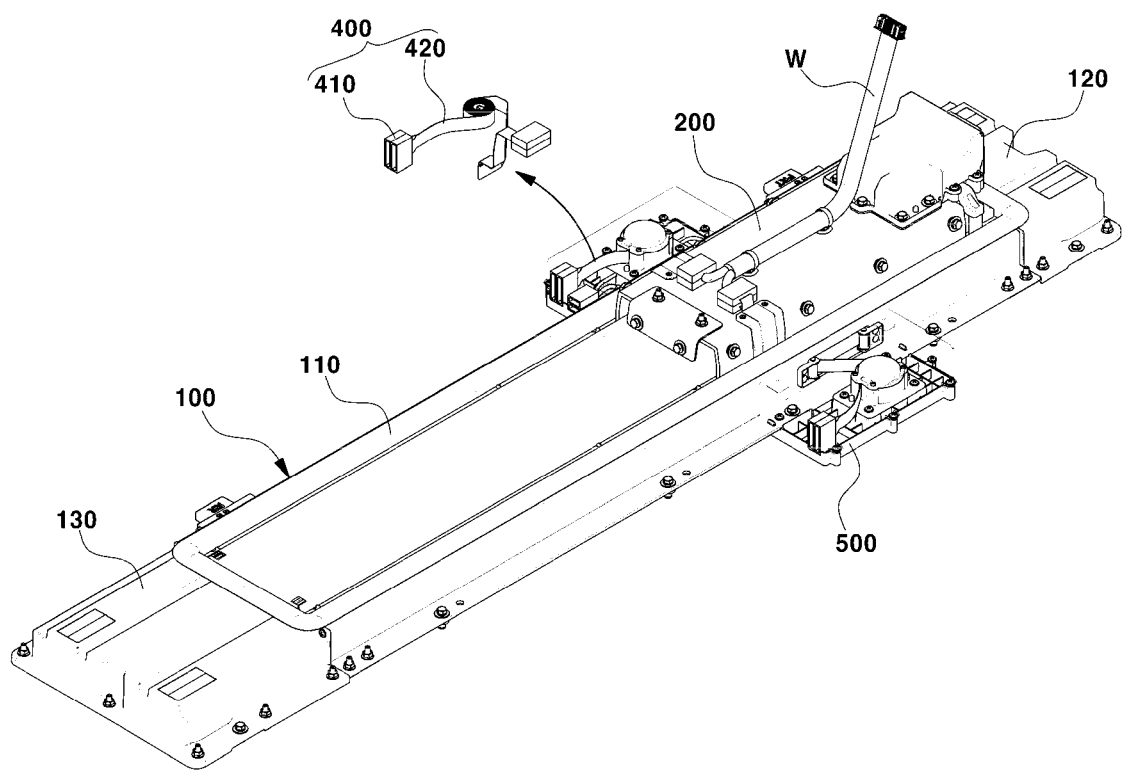
FIG. 11 is a view exemplarily illustrating a cable portion and a cable main body of a slide transfer device for a vehicle according to an exemplary embodiment of the present disclosure.

FIG. 8 is a view exemplarily illustrating a front panel assembly and a rear panel assembly of a slide transfer device for a vehicle according to an exemplary embodiment of the present disclosure, FIG. 9 and FIG. 10 are views of areas A, B, and B' of FIG. 8 illustrating the structures of a support guide and a reducer for a slide transfer device for a vehicle according to an exemplary embodiment of the present disclosure, and FIG. 11 is a view exemplarily illustrating a cable portion and a cable main body of a slide transfer device for a vehicle according to an exemplary embodiment of the present disclosure.

Generally, a slide-transferable structure, e.g., a vehicle center console, is provided in a space between a driver's seat and a passenger seat in a vehicle interior, has mounted thereto various types of electrical components such as a universal serial bus (USB) and a shift by wire (SBW), and is used as a storage place for storing items used by a driver and a passenger.

The vehicle center console may be slidably mounted between the driver's seat and the passenger seat to offer a rear seat occupant utmost convenience in a vehicle including two or more rows of seats.

To the present end, a slide transfer device for a vehicle according to the present exemplary embodiment includes a first rail portion 100 and a second rail portion 200.

The first rail portion 100 and the second rail portion 200 are rail-coupled to each other, and the second rail portion 200 is rail-coupled to the first rail portion 100 and slides in the front and rear direction of the first rail portion 100, which has a length and is fixedly coupled to a vehicle body.

The first rail portion 100 and the second rail portion 200 may be a lower rail and an upper rail, respectively.

Accordingly, when a structure such as a center console moves between the first row seat and the second row seat in a state in which the second rail portion 200, the upper rail, is slidably mounted to a guide rail 110 of the first rail portion 100, the lower rail, the second rail portion 200 to which the structure is coupled slides in the front and rear direction of the first rail portion 100 including the guide rail 110.

Here, the first rail portion 100 may include a movement guide 131 protruding toward the second rail portion 200. Because the movement guide 131 is bent at a predetermined inclination from the upper surface of the first rail portion 100 and is inserted into a mounting hole H in the second rail portion 200 (see FIGS. 3 and 7), the second rail portion 200 may stably slide without being separated from the first rail portion 100.

The first rail portion 100 including the guide rail 110 includes a front to which a front panel assembly 120 shielded from outside by a cover 120a is coupled, and includes a rear to which a rear panel assembly 130 shielded from outside by a cover 130a is coupled. The front panel assembly 120 and the rear panel assembly 120 include a stopper, a driving motor, and the like, and are configured to fix and support a lead screw 200a. Therefore, when the lead screw 200a rotates in forward and reverse directions by operation of the driving motor, the second rail portion 200 screwed to the front panel assembly 120 and to the rear panel assembly 120 by the lead screw 200a may slide and reciprocate in the longitudinal direction of the lead screw 200a (see FIG. 2).

However, in the rail coupling structure of the first rail portion 100 and the second rail portion 200 including the above structure, a gap may be generated between the internal circumferential surface of the mounting hole H and the external circumferential surface of the movement guide 131 in a state in which the movement guide 131 is inserted into the mounting hole H, causing noise and vibration when the second rail portion 200 slides.

Similarly, in the structure of the front panel assembly 120 and the rear panel assembly 130 configured to fix and support the opposite end portions of the lead screw 200a also, noise and vibration may occur due to a gap generated by the structure for supporting rotation of the lead screw 200a.

To reduce noise and vibration, the slide transfer device for a vehicle according to the exemplary embodiment of the present disclosure may include a damper 300, as illustrated in FIG. 3 and FIG. 4.

The damper 300 is mounted inside the mounting hole H, and supports one end portion of the movement guide 131 inserted into the mounting hole H. The one end portion is a rounded head portion 132 as illustrated in FIG. 7.

The damper 300 is made of an elastic material and includes a shape of a circle in its initial state. When the damper 300 is mounted in the mounting hole H, one side of the damper 300 may be deformed to be open, i.e., one side thereof may break. The damper 300 mounted in the instant way supports the head portion 132 of the movement guide 131 inside the mounting hole H as described above.

The damper 300 has a diameter corresponding to the internal diameter of the mounting hole H, and includes a structure surrounding and supporting the external circumferential surface of the head portion 132 at the center portion of the mounting hole H.

Here, the damper 300 includes a predetermined height from the center portion thereof surrounding the head portion 132, and as shown in FIG. 5, includes a plurality of holes 300a formed radially, i.e., in the height direction, from the center portion.

The holes 300a may include a predetermined pattern and be regularly disposed in the damper 300, or may each have different sizes and be irregularly disposed in the damper 300.

The holes 300a are for implementing damping in the vertical and horizontal directions thereof. The holes 300a absorb shocks generated in the vertical and horizontal directions when the second rail portion 200 slides along the first rail portion 100, damping the noise and vibrations which may be generated when the second rail portion 200 slides.

Furthermore, the holes 300a allow lubricant such as grease applied on the head portion 132 to penetrate and stay therein, enabling easy sliding movement even with a relatively small force.

In other words, when the second rail portion 200 slides in a state in which lubricant is applied on the head portion 132 and the damper 300 is brought into contact with the head portion 132 of the movement guide 131, the lubricant is provided to penetrate into the plurality of holes 300a by the interfacial tension acting between the damper 300 and the movement guide 131, and then during the damping action in the sliding movement, the lubricant penetrated into the holes 300a is discharged outside and applied on the contact surface between the head portion 132 and the damper 300.

Thus, the frictional force on the contact surface may be effectively reduced, in other words, the state in which lubricant is applied on the contact surface may be maintained, enabling easy sliding movement of the second rail portion 200 with a relatively small force.

Here, the damper 300 may be provided in plural so that at least one dampers may be mounted inside the mounting hole H. The number of dampers 300 mounted inside the mounting hole H may be increased as the weight of a structure such as a center console mounted on the second rail portion 200 increases.

In an exemplary embodiment of the present disclosure, the damper 300 further include a slot 300b connecting an inner hole 300c to the holes 300a.

Meanwhile, as illustrated in FIG. 9 and FIG. 10, the front panel assembly 120 and the rear panel assembly 130 are provided with a pair of support guides 122 configured to support the opposite sides of the lead screw 200a (areas B and B' of FIG. 8), and a reducer 134 configured to reduce the rotation speed of the driving motor, the driving motor M being configured to rotate the lead screw 200a (area A of FIG. 8). Because the pair of support guides 122 and the reducer 134 are configured to fix and support the front side and the rear side of the lead screw 200a in the front panel assembly 120 and the rear panel assembly 130, noise and vibrations may be generated while the same support the rotation of the lead screw 200a, as described above.

For the present reason, the front panel assembly 120 and the rear panel assembly 130 may be provided with bearing members 122a and 134a. Here, the bearing members 122a and 134a are mounted in the support guide 122 and in the reducer 134, respectively, and surround the external circumferential surface of the lead screw 200a being axis-coupled to the support guide 122 and to the reducer 134.

The bearing members 122a and 134a may include the same structure as the damper 300. In other words, the bearing members 122a and 134a may each include a plurality of holes formed radially from the center portion thereof.

As a result, the pair of support guides 122, configured to support the lead screw 200a, and the reducer 134, including the driving motor M configured to transmit operating torque to the second rail portion 200, also have mounted therein the bearing members 122a and 134a, respectively, to offset the gap with the lead screw 200a in the mounting area and to allow damping using the hollow structure, effectively absorbing noise and vibration generated by the lead screw 200a when the second rail portion 200 slides.

As illustrated in FIG. 11, the slide transfer device for a vehicle according to the exemplary embodiment of the present disclosure may further include a cable portion 400 and a cable main body 500.

The cable portion 400 electrically contacts with a main wiring W in a housing, which slides together with the second rail portion 200 as described above.

The cable portion 400 may include a connector member 410 and a draw-out member 420.

The connector member 410 is provided at each of opposite sides of the main wiring W positioned on the second rail portion 200, and electrically contacts with the main wiring W.

The connector member 410 includes a printed circuit board, and is configured to electrically connect the printed circuit board to the main wiring W.

Furthermore, the draw-out member 420 is connected to the connector member 410, extends in the left and right direction of the second rail portion 200, and is wound inside the cable main body 500 mounted at each of opposite sides of the first rail portion 100.

The draw-out member 420 may be a general flexible flat cable (FFC) made of a flexible and flat cable, in which a solid wire layer including a plurality of conductor wires is embedded, being deformable into various shapes. Thus the draw-out member 420 may be provided in a relatively narrow space, such as a space between a driver's seat and a passenger seat.

The cable portion 400 wound inside the cable main body 500 may be selectively drawn out or drawn in as the second rail portion 200 slides in the front and rear direction of the first rail portion 100.

The cable main body 500 is mounted to the first rail portion 100 by protruding from each of the opposite sides of the first rail portion 100, and is shielded from outside by a separate cover.

Moreover, the cable main body 500 accommodates therein the cable portion 400 including the FFC, and elastically supports the cable portion 400.

In other words, the cable main body 500 provides an elastic force in a direction to wind the cable portion 400 therein, maintaining a tension even when the cable portion 400 is drawn out.

Accordingly, when the second rail portion 200 slides, the cable portion 400 connected to the main wiring W may be drawn out from the cable main body 500 and the length of the cable portion 400 may be adjusted with respect to the sliding direction of the second rail portion 200. Therefore, a quality problem which may occur when the main wiring W is increased in length and causing interference with the surroundings or damage to the main wiring W may be prevented.

As is apparent from the above description, the present disclosure provides the following effects.

According to an exemplary embodiment of the present disclosure, a slide transfer device includes a structure in which an upper rail slides along a lower rail and the upper rail slides in the longitudinal direction of a movement guide protruding from the lower rail, and a bearing is mounted inside a mounting hole, formed in the upper rail and into which the movement guide is inserted, so that the bearing absorbs vibration generated when the upper rail slides, enabling a stable sliding movement.

Furthermore, the bearing is also adopted to a reducer of a lead screw configured to transmit operating torque to the upper rail upon operation of a driving motor, absorbing vibration and compensating shaft misalignments to prevent problems such as shaft distortion caused by vibration.

Furthermore, when the upper rail slides in a state in which the bearing is brought into contact with the movement guide, lubricant, penetrated into a plurality of through holes formed in the bearing by the interfacial tension acting between the bearing and the movement guide, is discharged outside and evenly applied on the contact surface between the bearing and the movement guide to thereby reduce the frictional force on the contact surface effectively, and thus enabling easy sliding movement with a relatively small force.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The term "and/or" may include a combination of a plurality of related listed items or any of a plurality of related listed items. For example, "A and/or B" includes all three cases such as "A", "B", and "A and B".

In the present specification, unless stated otherwise, a singular expression includes a plural expression unless the context clearly indicates otherwise.

In exemplary embodiments of the present disclosure, "at least one of A and B" may refer to "at least one of A or B" or "at least one of combinations of at least one of A and B". Furthermore, "one or more of A and B" may refer to "one or more of A or B" or "one or more of combinations of one or more of A and B".

In the exemplary embodiment of the present disclosure, it should be understood that a term such as "include" or "have" is directed to designate that the features, numbers, steps, operations, elements, parts, or combinations thereof described in the specification are present, and does not preclude the possibility of addition or presence of one or more other features, numbers, steps, operations, elements, parts, or combinations thereof.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A slide transfer apparatus for a vehicle, the slide transfer apparatus comprising:
   a first rail portion fixed to a vehicle body;
   a second rail portion rail-coupled to the first rail portion to slide in a front and rear direction of the first rail portion, and slidably coupled to a movement guide protruding from the first rail portion; and
   a damper mounted in a mounting hole formed in the second rail portion, and configured to support the movement guide inserted into the mounting hole of the second rail portion.

2. The slide transfer apparatus of claim 1, wherein the movement guide extends at an inclination from an upper surface of the first rail portion, and is inserted into the mounting hole of the second rail portion.

3. The slide transfer apparatus of claim 1,
   wherein the damper has a diameter corresponding to an internal diameter of the mounting hole, and
   wherein a center portion of the damper surrounds an external circumferential surface of the movement guide.

4. The slide transfer apparatus of claim 1, wherein the damper includes a plurality of holes formed radially from a center portion thereof and surrounding an external circumferential surface of the movement guide.

5. The slide transfer apparatus of claim 4, wherein the damper further includes:
   an inner hole surrounding an external circumferential surface of the movement guide; and
   a slot connecting the inner hole to the plurality of holes.

6. The slide transfer apparatus of claim 1, wherein the damper includes an elastic material and has one side open to allow the movement guide to be positioned in a center portion of the damper.

7. The slide transfer apparatus of claim 1, wherein the damper is provided in plural and the plurality of dampers are mounted in the mounting hole.

8. The slide transfer apparatus of claim 1,
   wherein the first rail portion includes a front panel assembly and a rear panel assembly configured to support a lead screw being configured to transmit operating torque to the second rail portion, and
   wherein the front panel assembly and the rear panel assembly include a support guide configured to support the lead screw, a driving motor configured to rotate the lead screw, and a reducer configured to reduce a rotation speed of the driving motor.

9. The slide transfer apparatus of claim 8, wherein the front panel assembly and the rear panel assembly include bearing members, mounted in the support guide and in the reducer, respectively, and surrounding an external circumferential surface of the lead screw being axis-coupled to the support guide and to the reducer.

10. The slide transfer apparatus of claim 9, wherein the bearing member includes an elastic material and includes a plurality of holes formed radially from a center portion thereof.

11. The slide transfer apparatus of claim 1, further including:
    a cable portion connected to a main wiring configured to slide together with the second rail portion, and electrically contacting with the main wiring; and
    a cable main body configured to allow the cable portion to be selectively drawn out or drawn in as the second rail portion slides in the front and rear direction of the first rail portion.

12. The slide transfer apparatus of claim 11, wherein the cable portion includes:
    a connector member electrically contacting with the main wiring; and
    a draw-out member, connected to the connector member, extending in a left and right direction of the second rail portion, and wound inside the cable main body fixed to the first rail portion.

13. The slide transfer apparatus of claim 12, wherein the draw-out member is a flexible flat cable (FFC).

* * * * *